Figure 1:
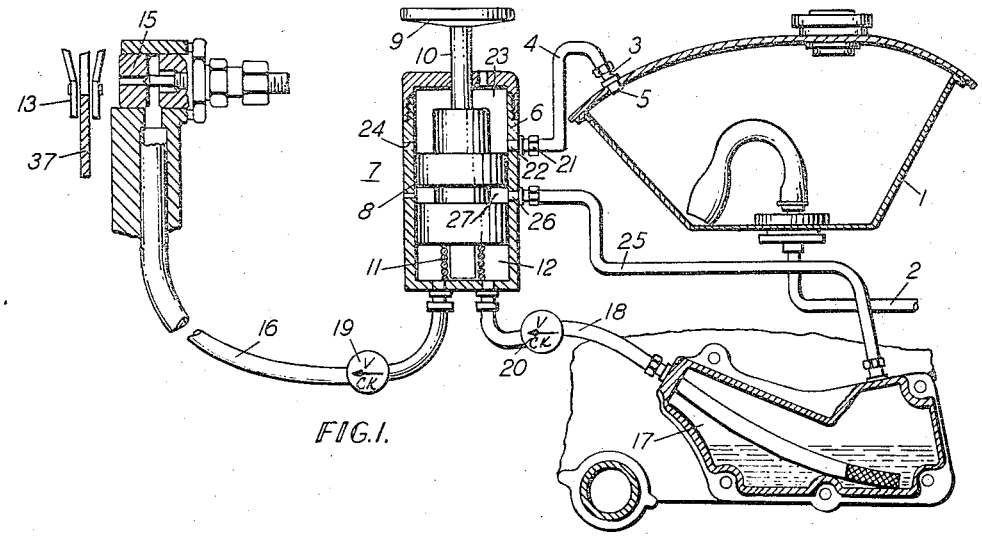

INVENTOR.
DANIEL A. ARMSTRONG
BY
ATTORNEYS

United States Patent Office 2,852,096
Patented Sept. 16, 1958

2,852,096

MANUAL OILING SYSTEM FOR ENGINE-DRIVEN TOOLS

Daniel A. Armstrong, Thiensville, Wis., assignor to Kiekhaefer Corporation, Cedarburg, Wis., a corporation of Wisconsin Application March 30, 1956, Serial No. 575,166

8 Claims. (Cl. 184—15)

This invention relates to engine driven portable devices such as a chain saw having parts requiring only periodic lubrication and a fuel tank requiring at least occasional venting.

According to the invention, a valve device for manual operation is connected to the fuel tank to vent the tank upon such operation and controls the lubrication referred to. Venting of the tank occurs automatically during each period of lubrication and the vent is otherwise closed so that leakage of fuel from the tank through the vent is eliminated. This consideration is especially important as in a chain saw to be operated in any of several positions with the vent below the level of the fuel.

The periodic lubrication which is generally required is assured by reason of the fact that the engine will not operate without occasional venting of the tank to relieve the partial vacuum which develops in the tank. Accordingly, the necessity of occasional venting of the tank assures the minimum periodic lubrication of the parts required.

The drawings furnished herewith illustrate the best mode of carrying out the invention as presently contemplated and set forth hereinafter.

Figure 2:
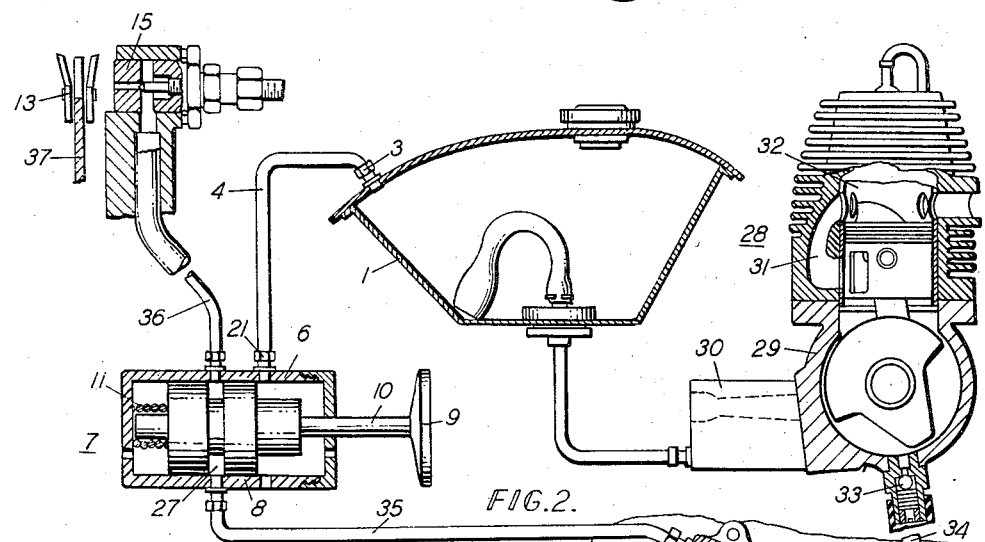
Figure 3:
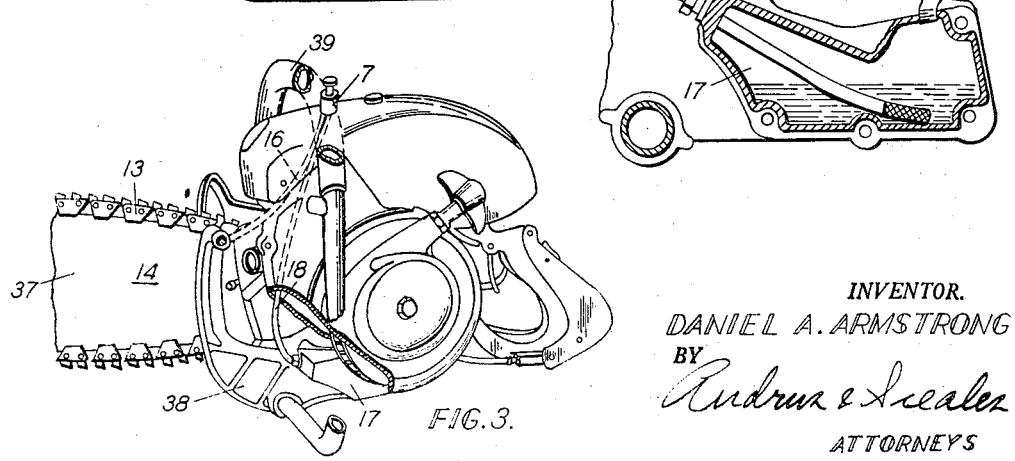

In the drawings:

Figure 1 is a diagrammatic representation of a lubrication system and fuel tank having a vent hole connected by a line with a valve device which also comprises a pump whereby operation of the pump to lubricate the parts shown also opens the tank vent;

Fig. 2 is a diagrammatic representation similar to Figure 1 but including the engine to show separate means providing delivery of the lubricant as controlled by the valve device; and Fig. 3 is a perspective view of a chain saw unit showing a part of the saw chain and guide rail which is broken away and sectioned and illustrates the use of the lubricant reservoir and valve device of Figure 1 and Fig. 2.

The fuel tank 1 associated with the lubricating system of Figure 1 and in its normal position as shown, has a lower delivery line 2 connected to the engine, not shown in Figure 1, and an upper fitting 3 which secures one end of the line 4 in communication with the tank vent hole 5. The opposite end of line 4 is connected to the cylinder 6 of the valve device 7 which includes the manually operable piston 8.

Piston 8 is reciprocable in cylinder 6 by pushing downwardly on the thumb-piece 9 of the stem 10 of piston 8 to the position shown. The spring 11 in the chamber 12 at the lower end of the cylinder 6 provides the return of piston 8 to an upper position, not shown.

The saw chain 13 shown in the cross-section in Figure 1, illustrates a part requiring lubrication and forms a part of the chain saw unit 14 shown in Fig. 3 and described hereinafter. The nozzle 15 connected by the conduit 16 with chamber 12 is disposed to direct the lubricant onto the saw chain 13 as the lubricant is received under the pressure developed by movement of piston 8 in the direction effected by depressing thumb-piece 9. As the piston is moved in the return direction by spring 11, lubricant is drawn from the lubricant reservoir 17 through the line 18 which connects reservoir 17 and the chamber 12 of cylinder 6. Suitable check valves 19 and 20 shown diagrammatically are located in conduit 16 and line 18 to prevent the return flow of lubricant in conduit 16 to chamber 12 and in line 18 to reservoir 17.

The vent line 4 having one end connected to tank 1 is connected at its other end by the fitting 21 to cylinder 6 to communicate with the port 22 opening into the chamber 23 at the upper end of cylinder 6.

Port 22 and the corresponding vent 24 are located so that either and preferably both port 22 and vent 24 are closed by piston 8 in its normal position as maintained by spring 11 and so that the movement of piston 8 to the position shown in Figure 1 as in lubricating chain 13 provides communication between port 22 and the vent 24. The corresponding vent line 25 from reservoir 17 is connected to cylinder 6 for communication with the vent 26 as is provided by registration of the groove 27 with line 25 and vent 26 only when the piston is in the position shown in Figure 1.

To relieve the negative pressure which would ordinarily develop therein, tank 1 and reservoir 17 are vented momentarily at the end of each manually effected stroke of piston 8. The vents are otherwise maintained closed upon the return stroke of piston 8 by spring 11 so that even while tank 1 is in an inverted position no fuel leakage will occur. The momentary venting provided is adequate to allow air to sufficiently enter each vent line and the vents are otherwise closed so that no dust or dirt can get into the tank or reservoir. No fuel or lubricant will ordinarily flow outwardly upon opening of vent line 4 or line 25 even while the lines are below the level of the fuel or lubricant for the reason that negative pressures only are ordinarily being relieved.

The embodiment of the invention as shown in Fig. 2 includes the two-cycle engine 28 illustrated diagrammatically. Engine 28 includes the crankcase 29 which receives the fuel and air mixture from the carburetor 30 for precompression and transfer through passage 31 to the combustion chamber 32. As described and claimed in Patent No. 2,605,787, granted August 5, 1952, to E. C. Kiekhaefer for Pressurized Chain Saw Oiling System, the excess lubricant from crankcase 29 is allowed to pass the check-valve 33 and into the line 34 which connects check valve 33 and reservoir 17. The check valve serves to maintain within reservoir 17 the maximum pressure which is only intermittently developed in crankcase 29 and thereby maintains the lubricant under pressure for its delivery to nozzle 15. The lubricant delivery line 35 from reservoir 17 is connected to cylinder 6 to communicate with the line 36 connecting cylinder 6 and nozzle 5 when the piston 8 is in the position as shown and with groove 27 in registry therewith.

In the embodiment of Fig. 2 piston 8 operates as a valve which simultaneously vents tank 1 as previously described while allowing lubricant to be delivered to nozzle 15 under pressure maintained by engine 28. In the both embodiments, the venting of tank 1 is associated with the lubrication of the saw chain 13 so that, in accordance with the invention, the occasional venting of the tank required guarantees that at least a minimum of lubrication is applied to the saw chain.

The lubrication otherwise applied to the saw chain is entirely within the control and judgment of the operator.

The chain saw unit 14 shown in Fig. 3 includes the guide rail 37 which is fixed to the transmission case 38 and carries the saw chain 13. Nozzle 15 is located above guide rail 37 and is incorporated in the structure of the transmission case. The valve device 7 is carried adjacent to the handle 39 for periodic operation as described.

The invention may be employed in connection with any of various portable engine driven tools requiring additional lubrication of the specific parts and other engine-driven means for delivery of the lubricant may be employed subject to the control of the operator by the valve device as described.

Various modes of carrying out the invention are contemplated as within the scope of the following claims particularly pointing out and distinctly claiming the subject matter which is regarded as the invention.

I claim:

1. In a portable engine-driven unit having a specific part requiring periodic lubrication by the operator such as a chain saw unit having a saw chain requiring such lubrication, an engine fuel tank having a vent, and a lubrication system including a manually operable valve device for the delivery of lubrication to said part, said fuel tank vent communicating with said valve device and said valve device having a manually movable member providing for lubrication only upon movement from a first position to a second position and having means normally biasing the movable member to said first position and with respect to said tank vent to close the vent, said member being periodically movable to the second position to open said vent whereby periodic lubrication and venting of the tank is effected simultaneously and the occasional required venting of the tank prevents operation of the unit without corresponding lubrication of the specific part referred to.

2. In a lubrication system for a portable engine-driven unit having a specific part requiring periodic lubrication by the operator, said unit including an engine fuel tank having a vent, a lubrication reservoir having a line from the reservoir to said part, means for pressurizing the reservoir for transmission of lubricant through said line, and a manually operable valve device disposed in said line, said valve device comprising a valve body having connection with said tank to form said tank vent and a manually movable member disposed in said body to provide for the flow of lubricant only upon movement from a first position to a second position and having means normally biasing the movable member to said first position and with respect to said tank vent to close the vent, said member being periodically movable to the second position to open said vent whereby periodic lubrication and venting of the tank is effected simultaneously and the occasional required venting of the tank prevents operation of the unit without corresponding lubrication of the specific part referred to.

3. In an engine-driven unit having a specific part requiring periodic lubrication, a fuel tank having an opening, said tank developing negative pressures as fuel is withdrawn therefrom for engine operation tending to kill said engine and therefore requiring periodic venting to maintain a pressure differential between the tank and engine to provide for continued delivery of fuel to the engine and continued engine operation, a reservoir containing lubricant and having a line from the reservoir to said part, means for pressurizing the reservoir for the transmission of lubricant through said line, and a manually operable valve device disposed in said line and comprising a valve body communicating with the fuel tank opening to provide a tank vent and a movable member disposed in said body and normally biased to a first position to close said fuel tank vent and said lubricant line, said member being periodically manually movable to a second position within the valve body to simultaneously open the fuel tank vent and the lubricant line to vent the tank and lubricate said part, said required periodic venting of the tank providing for continued operation of the engine and preventing operation of the engine-driven unit without corresponding lubrication of said specific part.

4. The invention of claim 3 wherein the engine for said unit is a two-cycle engine employing crankcase precompression of the fuel and the intermittent crankcase pressure is utilized to pressurize the lubricant reservoir.

5. The invention of claim 3 wherein the engine-driven unit is an engine-driven chain saw and the specific part requiring periodic lubrication is the saw chain.

6. In an engine-driven chain saw unit wherein the saw chain requires periodic lubrication and the engine is a two-cycle engine employing crankcase precompression of the fuel, a fuel tank having an opening, said tank developing negative pressures as fuel is withdrawn therefrom for engine operation tending to kill said engine and therefore requiring periodic venting to maintain a pressure differential between the tank and engine to provide for continued delivery of fuel to the engine and continued engine operation, a reservoir containing a lubricant and having a line from the reservoir to the saw chain, conduit means interconnecting the reservoir and the engine crankcase whereby the intermittent crankcase pressure is utilized to pressurize the lubricant reservoir for transmission of lubricant through said line, and a manually operable valve device disposed in said line and comprising a valve body communicating with the fuel tank opening to provide a tank vent and a movable member disposed in said valve body and normally biased to a first position to close said fuel tank vent and said lubricant line, said member being periodically manually movable to a second position within the valve body to simultaneously open the fuel tank vent and the lubricant line to vent the tank and lubricate the saw chain, said required periodic venting of the tank providing for continued operation of the engine and preventing operation of the chain saw unit without corresponding lubrication of the saw chain.

7. In an engine-driven unit having a specific part requiring periodic lubrication, a fuel tank having an opening, said tank developing negative pressures as fuel is withdrawn therefrom for engine operation tending to kill said engine and therefore requiring periodic venting to maintain a pressure differential between the tank and engine to provide for continued delivery of fuel to the engine and continued engine operation, a reservoir containing a lubricant and having an opening, a line from the reservoir to said specific part for the transmission of lubricant from the reservoir to the part, a manually operable valve device disposed in said line, and check valves disposed in said line to either side of the valve device, said valve device comprising a valve body communicating respectively with the openings in the fuel tank and reservoir to provide a tank vent and a reservoir vent and a movable member disposed in said body and normally biased to a first position closing the fuel tank and reservoir vents and being movable to a second position opening said vents, said member being periodically manually movable to said second position to vent said fuel tank and reservoir and together with said check valves providing for pumping of the lubricant through said line to lubricate said specific part, said required periodic venting of the fuel tank providing for continued operation of the engine and preventing operation of the engine-driven unit without corresponding lubrication of the specific part.

8. The invention of claim 7 wherein the engine-driven unit is an engine-driven chain saw and the specific part requiring periodic lubrication is the saw chain.

References Cited in the file of this patent

UNITED STATES PATENTS

| | | |
|---|---|---|
| 1,399,967 | King | Dec. 13, 1921 |
| 2,108,710 | Gleockler | Feb. 15, 1938 |